(12) United States Patent
Tsuji

(10) Patent No.: US 11,821,875 B2
(45) Date of Patent: Nov. 21, 2023

(54) MATERIAL TESTING MACHINE

(71) Applicant: SHIMADZU CORPORATION, Kyoto (JP)

(72) Inventor: Hiroshi Tsuji, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 536 days.

(21) Appl. No.: 17/263,887

(22) PCT Filed: Jul. 31, 2018

(86) PCT No.: PCT/JP2018/028755
§ 371 (c)(1),
(2) Date: Jan. 27, 2021

(87) PCT Pub. No.: WO2020/026363
PCT Pub. Date: Feb. 6, 2020

(65) Prior Publication Data
US 2021/0325283 A1 Oct. 21, 2021

(51) Int. Cl.
*G01N 3/06* (2006.01)
*G01N 3/08* (2006.01)

(52) U.S. Cl.
CPC .............. *G01N 3/06* (2013.01); *G01N 3/08* (2013.01); *G01N 2203/0017* (2013.01);
(Continued)

(58) Field of Classification Search
CPC ... G01N 2203/0017; G01N 2203/0037; G01N 2203/0202; G01N 2203/04; G01N 2203/06; G05B 23/02
See application file for complete search history.

(56) References Cited

U.S. PATENT DOCUMENTS

| 4,426,713 A | 1/1984 | Shimizu et al. |
| 2011/0013737 A1* | 1/2011 | Lee ........................ G04C 11/04 375/356 |

(Continued)

FOREIGN PATENT DOCUMENTS

| EP | 2749968 A1 * | 7/2014 | ............ H04J 3/0667 |
| EP | 3889622 A1 * | 10/2021 | |

(Continued)

OTHER PUBLICATIONS

"Office Action of Japan Counterpart Application" with English translation thereof, dated Aug. 17, 2021, p. 1-p. 10.
(Continued)

*Primary Examiner* — Jonathan M Dunlap
(74) *Attorney, Agent, or Firm* — JCIPRNET

(57) ABSTRACT

A master unit includes a synchronization signal source that generates a synchronization signal and a synchronization signal distribution adjustment circuit that adjusts a distribution timing of the synchronization signal to each of slave units. The synchronization signal distribution adjustment circuit includes a period measurement circuit that measures a period of the synchronization signal output from the synchronization signal source, a time difference measurement circuit that measures a time difference between a time point of the synchronization signal issued from the master unit to the slave units and a time point of the synchronization signal returned from the slave units to the master unit, and a delay circuit that delays the issuing time point of the synchronization signal to be transmitted from the master unit to the slave units based on the period of the synchronization signal and the time difference.

3 Claims, 5 Drawing Sheets

(52) U.S. Cl.
CPC .............. *G01N 2203/0037* (2013.01); *G01N 2203/0202* (2013.01); *G01N 2203/04* (2013.01); *G01N 2203/06* (2013.01)

(56) References Cited

U.S. PATENT DOCUMENTS

| | | | |
|---|---|---|---|
| 2012/0057865 A1* | 3/2012 | Hasegawa | H04J 3/0655 398/16 |
| 2018/0328825 A1 | 11/2018 | Tsuji | |
| 2020/0065277 A1* | 2/2020 | Poulsen | G06F 13/36 |

FOREIGN PATENT DOCUMENTS

| | | |
|---|---|---|
| JP | H11161600 | 6/1999 |
| JP | 2009128174 | 6/2009 |
| JP | 2012191361 | 10/2012 |
| WO | 2017145255 | 8/2017 |

OTHER PUBLICATIONS

"International Search Report (Form PCT/ISA/210) of PCT/JP2018/028755," dated Oct. 23, 2018, with English translation thereof, pp. 1-4.

"Written Opinion of the International Searching Authority (Form PCT/ISA/237) of PCT/ JP2018/028755," dated Oct. 23, 2018, with English translation thereof, pp. 1-4.

"Notice of Allowance of Europe Counterpart Application," dated Jun. 7, 2023, p. 1-p. 29.

"Office Action of Europe Counterpart Application", dated Apr. 14, 2022, p. 1-p. 4.

* cited by examiner

MATERIAL TESTING MACHINE

CROSS-REFERENCE TO RELATED APPLICATION

This application is a 371 application of the international PCT application serial no. PCT/JP2018/028755, filed on Jul. 31, 2018. The entirety of each of the above-mentioned patent applications is hereby incorporated by reference herein and made a part of this specification.

TECHNICAL FIELD

The present invention relates to a material testing machine provided with a control device for synchronously operating a plurality of functional units.

BACKGROUND ART

A material testing machine that executes a material test is provided with a plurality of sensors in order to monitor the test force applied to a test piece and the displacement of the test piece during the test. The physical quantities detected by these sensors are digitized and input to the control device. The material test is performed for the purpose of measuring physical quantities for various analyses to evaluate the physical properties of materials, and the measurement results are stored in the control device as time series data. Conventionally, a synchronization signal has been used to match the operation time of data sampling by each sensor (see Patent Literature 1).

CITATION LIST

Patent Literature

Patent Literature 1: WO 2017/145255 A

SUMMARY OF INVENTION

Technical Problem

In a material testing machine, when a plurality of devices are operated in cooperation with each other, the set of the plurality of devices is divided into a master unit on the side that manages and controls the synchronization signal and a slave unit which is to be controlled. For example, when the synchronization signal is used in a terminal device such as a slave unit for input/output of a sensor, the synchronization signal generated by the master unit is distributed to a plurality of slave units and transmitted to the terminal device of the slave unit. The transmission path of the synchronization signal includes various connections with repeated branches such as T branch and tree branch, and a buffer or buffers. In such a transmission path, the lengths of the transmission lines from the synchronization signal source to the terminal device and the numbers of issuing elements (drivers) and receiving elements (receivers) through which the signal passes are diverse, and thus it becomes difficult to make the synchronization signals simultaneously reach each device.

It is possible to eliminate variations in the timing at which the synchronization signal reaches each device by using equal-length wirings (for example, a meander wiring) for the plurality of signal wirings on the board. However, if all wirings are set to match with the longest wiring, the signal quality deteriorates. Further, if the wirings should have equal length, a large space is required for storing the wirings, which hinders the space saving of the device. Furthermore, due to the system structure, it may not be always possible to use the equal-length wirings. It is possible to replace each device with an equivalent device made by a different company. However, if the device made by a different company has different pin arrangements, it is necessary to redesign the transmission path in order to make the wirings equal in length. Therefore, the replacement may not be easy.

The invention has been made to solve the above problems, and an object of the invention is to provide a material testing machine equipped with a control device capable of making synchronization signals reach terminal devices using the synchronization signal at the same time.

Solution to Problem

A first aspect of the invention is a material testing machine. The material testing machine includes a control device which includes a master unit, which includes a synchronization signal source for generating a synchronization signal, and a plurality of slave units, and operates the plurality of slave units in synchronization based on the synchronization signal from the master unit. The master unit includes the plurality of synchronization signal distribution adjustment circuits, each of which includes a period measurement circuit which measures a period of the synchronization signal output from the synchronization signal source, a time difference measurement circuit which measures a difference between an issuing time point at which the synchronization signal is issued from the master unit to one of the plurality of slave units and a return time point at which the synchronization signal returns from the slave unit to the master unit, and a delay circuit which sets, as a delay time length, a time length which is obtained by subtracting a half of a time difference measured in the time difference measurement circuit from a period of the synchronization signal measured in the period measurement circuit, and delays a time point at which the synchronization signal is issued from the master unit to the slave unit by the delay time length.

According to a second aspect of the invention, in the material testing machine according to the first aspect, the master unit includes a driver which transmits the synchronization signal to each of the plurality of slave units via each of the plurality of synchronization signal distribution adjustment circuits, and a receiver which receives the synchronization signal from the slave unit. The issuing time point is a time point at which the synchronization signal is output from the synchronization signal distribution adjustment circuit to the driver. The return time point is a time point at which the synchronization signal is input from the receiver to the synchronization signal distribution adjustment circuit.

According to a third aspect of the invention, in the material testing machine according to the second aspect, the slave unit is a measurement unit which processes a detection signal of a sensor which samples analog data.

Advantageous Effects of Invention

According to the first to third aspects of the invention, the master unit is provided with synchronization signal distribution adjustment circuits as many as the number of slave units. The synchronization signal distribution adjustment circuit includes a time difference measurement circuit configured to measure a time period from a time point at which the synchronization signal is output from the synchronization signal source to a time point at which the synchronization signal returns from each slave unit to the master unit by measuring a difference between an issuing time point at which the synchronization signal is issued from the master unit to each slave unit and a return time point at which the synchronization signal returns from each slave unit to the master unit, and a delay circuit configured to delay the output of the synchronization signal by the delay time length obtained from the period of the synchronization signal and the time difference. Therefore, it is possible to make the synchronization signals simultaneously reach a plurality of devices on the respective slave unit sides which use the synchronization signal.

According to the third aspect of the invention, since the slave unit is a measurement unit which processes the detection signal of the sensor which samples analog data, it is possible to synchronize the measurement time points of the sensors, such as a load cell and a displacement meter which detect different physical quantities, more accurately in a material test.

DESCRIPTION OF EMBODIMENTS

Figure 1:
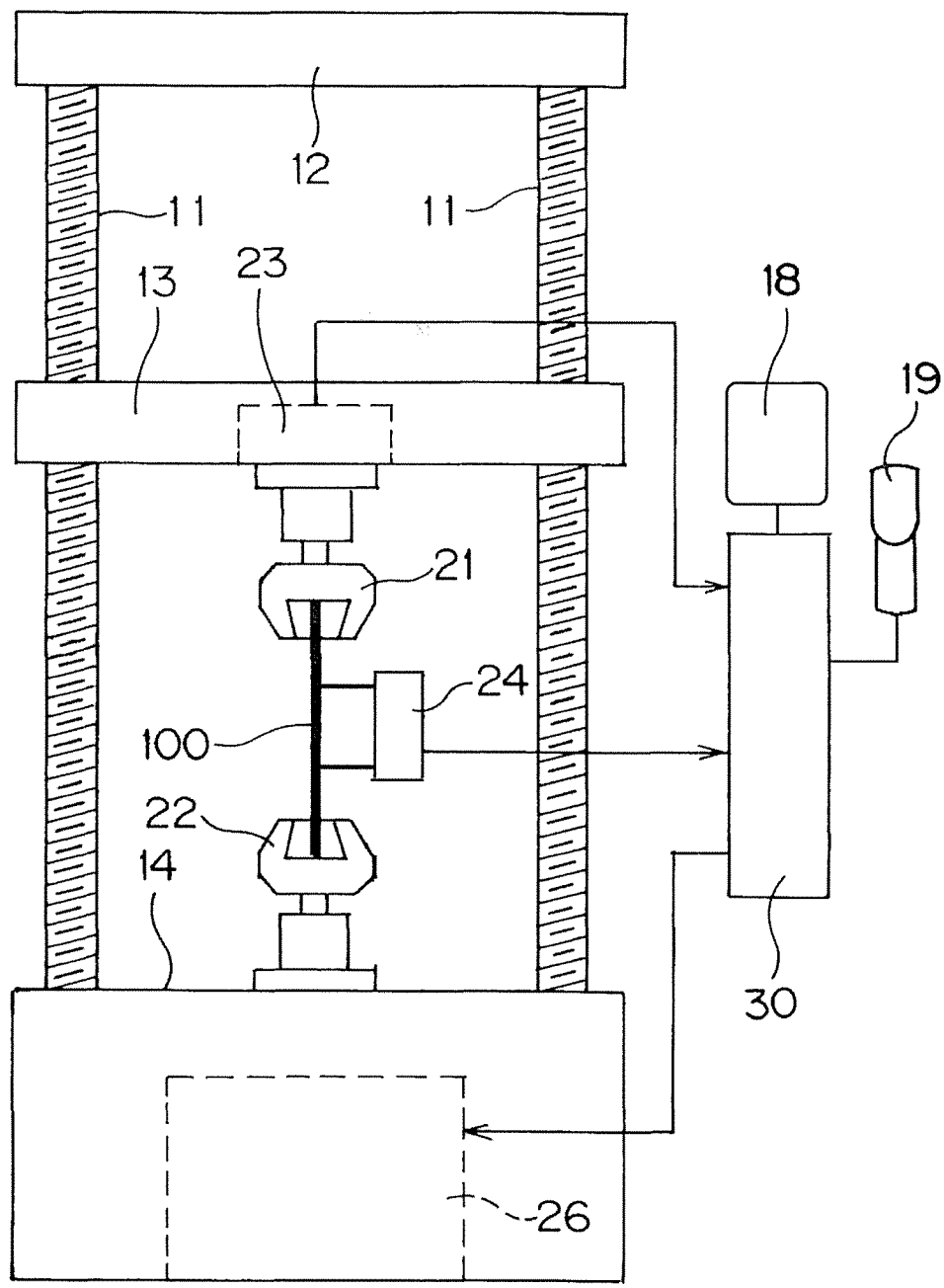
FIG. 1 is a front view illustrating the outline of a material testing machine of the invention.

Embodiments of the invention will be described below with reference to the drawings. FIG. 1 is a front view illustrating the outline of a material testing machine according to the invention.

The material testing machine includes a base 14, a cross yoke 12, a pair of screw rods 11 each rotatably erected from the base 14 to the cross yoke 12, a crosshead 13 that can move along the pair of screw rods 11, and a load mechanism 26 that rotates the pair of screw rods 11. The crosshead 13 is connected to the pair of screw rods 11 via nuts (not illustrated). The lower ends of the pair of screw rods 11 are connected to the load mechanism 26 arranged in the base 14, and the power from a power source in the load mechanism 26 is transmitted to the pair of screw rods 11. Then, as the pair of screw rods 11 rotate in synchronization, the crosshead 13 moves up and down along the pair of screw rods 11.

The crosshead 13 is provided with an upper grip 21 for gripping the upper end of a test piece 100 via a load cell 23. On the other hand, the base 14 is provided with a lower grip 22 for gripping the lower end of the test piece 100. When a tensile test is performed, a test force (tensile load) is applied to the test piece 100 by raising the crosshead 13 while both ends of the test piece 100 are gripped by the upper grip 21 and the lower grip 22.

At this time, the test force acting on the test piece 100 is detected by the load cell 23. On the other hand, the displacement generated in the test piece 100 is detected by a displacement meter 24 provided with a pair of arms in contact with the test piece 100. The detection signals of the load cell 23 and the displacement meter 24 are input to a control device 30. The control device 30 is constructed by a computer, a sequencer, and peripheral devices of them. The control device 30 includes a ROM in which an operation program necessary for controlling the device is stored, a RAM in which data and the like are temporarily stored during control, a CPU which executes a logical calculation, a hard disk for storing data, and the like. Further, the control device 30 is connected to an operation unit 19 used for starting/stopping a test and for raising/lowering the crosshead 13, and a display unit 18 for displaying a test force measured by the load cell 23 and a displacement amount measured by the displacement meter 24.

The control device 30 creates a drive control signal for the load mechanism 26. The drive control signal is transmitted to a servomotor 31 (see FIG. 2), which is the power source of the load mechanism 26, via a servo amplifier (not illustrated) arranged inside the base 14. The rotation of the servomotor 31 causes the pair of screw rods 11 to rotate in synchronization.

Figure 2:
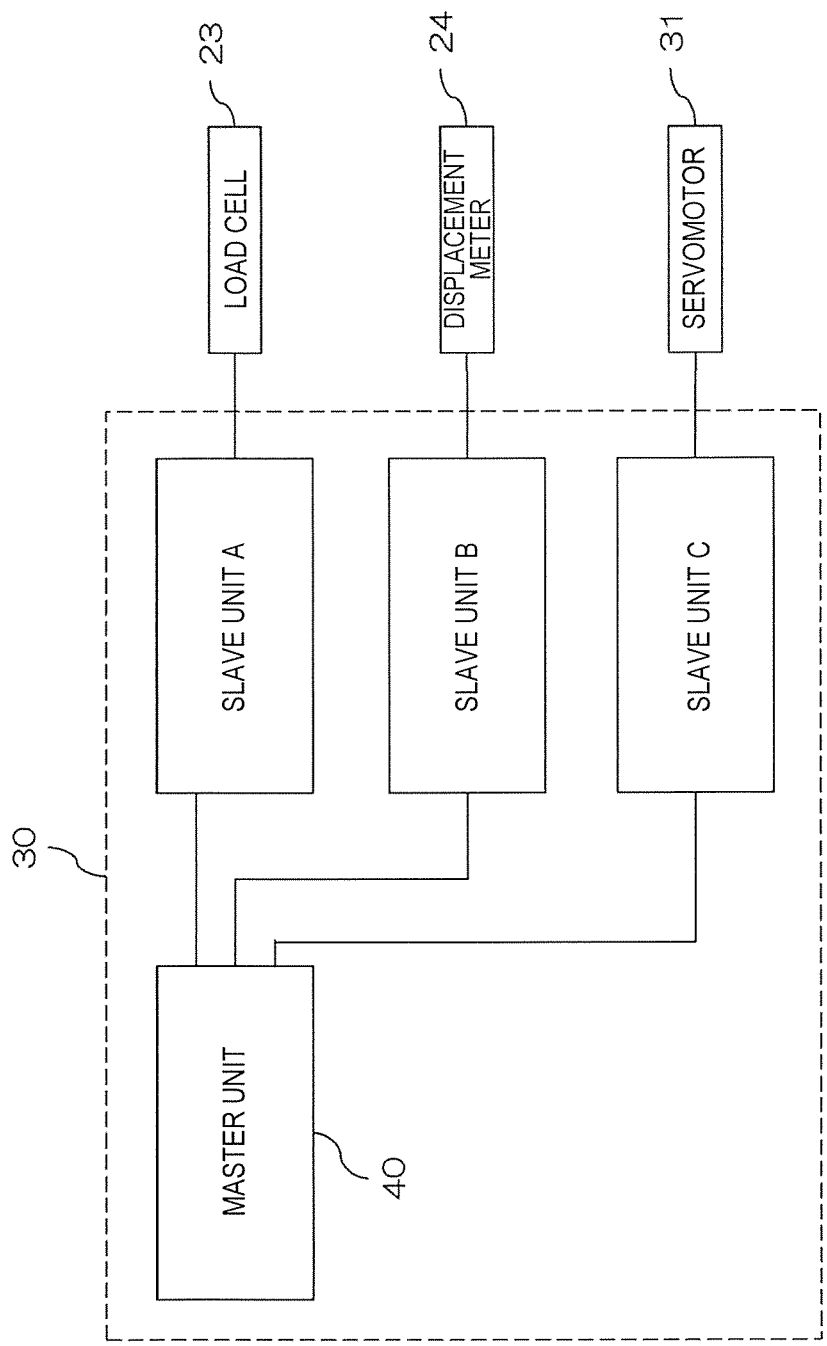
FIG. 2 is a block diagram illustrating the outline of the configuration of a control device 30.

FIG. 2 is a block diagram illustrating the outline of the configuration of the control device 30.

The control device 30 of this material testing machine is provided with a master unit 40 and a plurality of slave units. The slave unit is an element for data processing corresponding to the functions of measuring devices and sensors selected for a test, and an element for controlling the load mechanism 26. In this embodiment, three typical slave units A, B, and C are shown. The slave unit A is a measurement unit for processing test force data, which includes a load amplifier for amplifying the analog signal detected by the load cell 23 and an AD converter for converting the analog signal into a digital signal. The slave unit B is a measurement unit for processing displacement data, which includes a strain amplifier for amplifying the analog signal detected by the displacement meter 24 and an AD converter for converting the analog signal into a digital signal. The slave unit C is a control unit for controlling a load mechanism, which includes a DA converter for converting a rotation angle speed command of the servomotor 31 into an analog signal and a servo amplifier for supplying a current corresponding to the magnitude of the rotation angle speed command to the servomotor 31.

The master unit 40 is connected to each of the slave units A, B, and C by individual communication wiring. The displacement meter 24, the load cell 23, and the servomotor 31 connected to the ends of the slave units A, B, and C operate based on the synchronization signal transmitted from the master unit 40. The length of the communication wiring between the master unit 40 and each of the slave units A, B, and C is different, and a buffer may be inserted in the middle of the communication wiring depending on the function of the slave unit.

Figure 3:
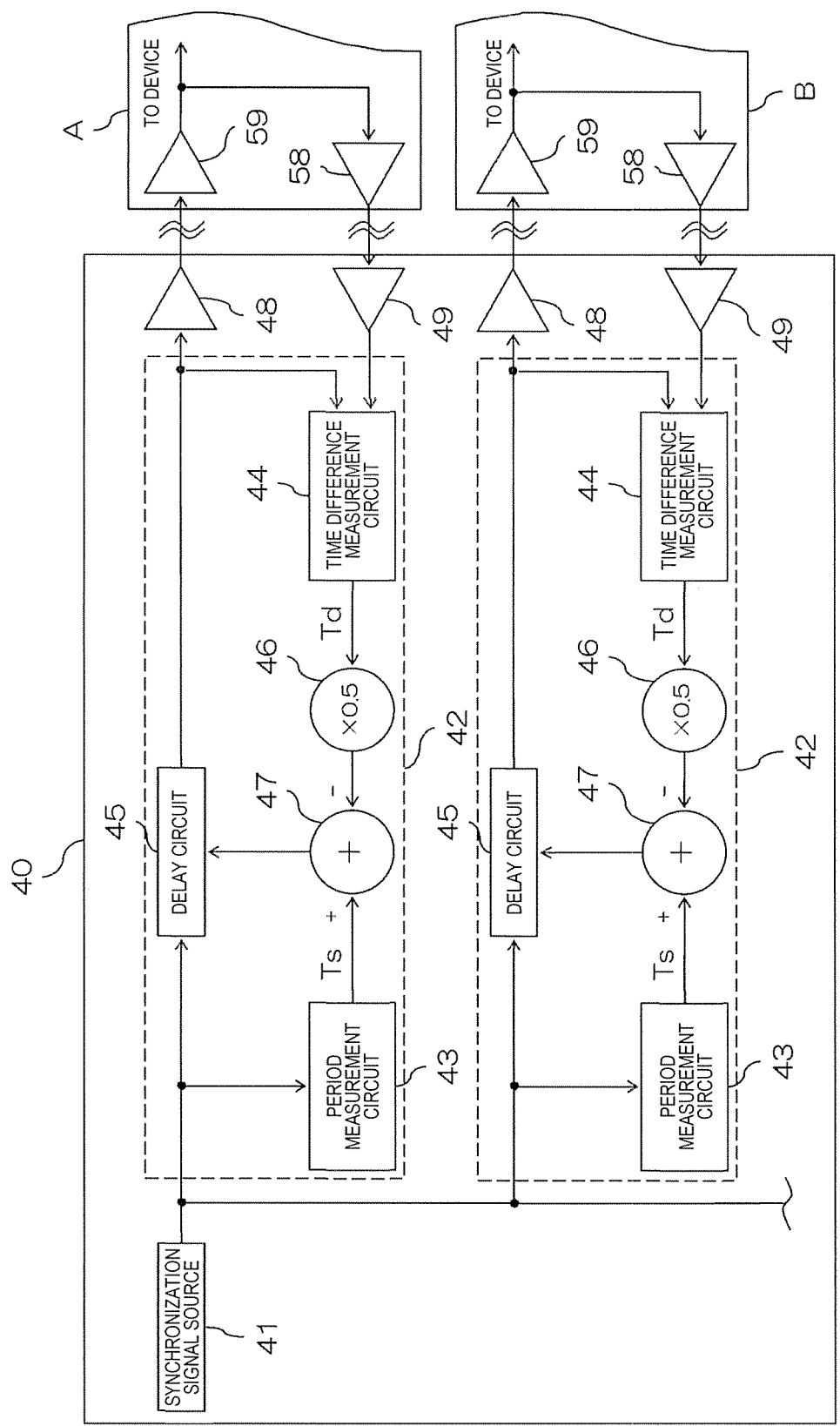
FIG. 3 is a block diagram illustrating a synchronization signal distribution adjustment circuit 42 in a master unit 40.
Figure 4:
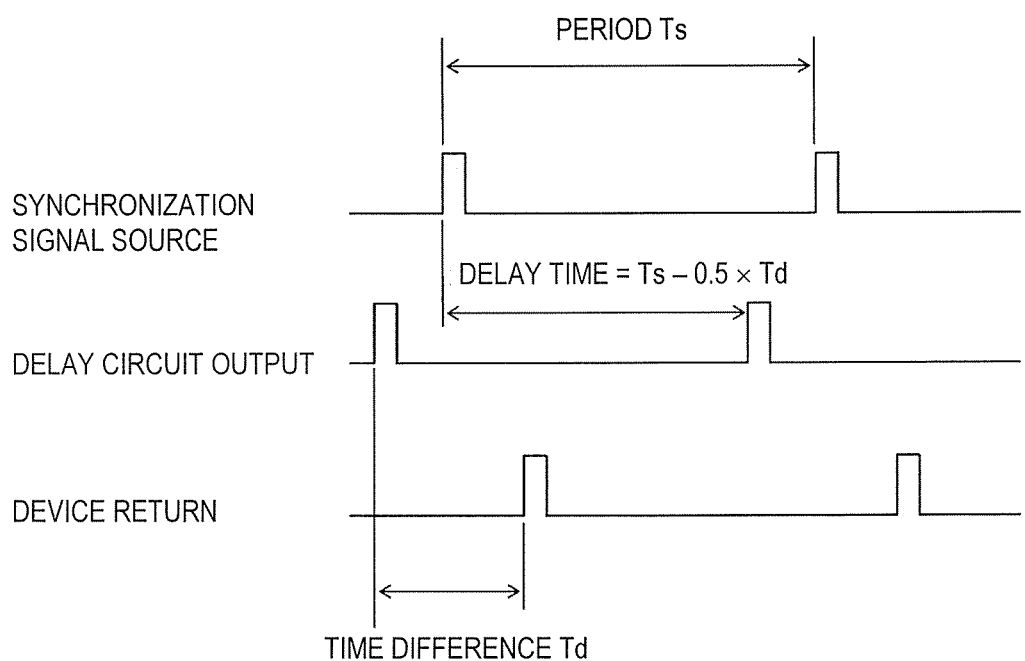
FIG. 4 is a timing chart for explaining a delay time length of a synchronization signal.

FIG. 3 is a block diagram illustrating a synchronization signal distribution adjustment circuit 42 in the master unit 40. FIG. 4 is a timing chart for explaining a delay time length of the synchronization signal.

The master unit 40 includes the synchronization signal source 41 that generates a synchronization signal and the plurality of synchronization signal distribution adjustment circuits 42 that adjust the distribution timing of the synchronization signal to each of the slave units A, B, and C. Each of the plurality of synchronization signal distribution adjustment circuits 42 includes a period measurement circuit 43 that measures a period Ts of the synchronization signal output from the synchronization signal source 41, a time difference measurement circuit 44 that measures a time difference Td between an issuing time point at which the synchronization signal is issued from the master unit 40 to the slave units A, B, and C and a return time point at which the synchronization signal returns from the slave units A, B, and C to the master unit 40, and a delay circuit 45 that delays the issuing time point of the synchronization signal to be transmitted from the master unit 40 to the slave units A, B, and C based on the period Ts (one period of time) of the synchronization signal and the time difference Td.

In the circuit configuration of the master unit 40, one synchronization signal source 41 is provided, while the synchronization signal distribution adjustment circuit 42, which includes the period measurement circuit 43, the time difference measurement circuit 44, and the delay circuit 45, is provided according to the number of slave units A, B, and C. In the measurement of physical quantities by the sensor of the material test, it is required to sample the test force data and the displacement data at the same time using the synchronization signal. Note that FIG. 3 illustrates circuits corresponding to slave units A and B that sample analog data while synchronizing. The master unit 40 is provided with a driver 48 and a receiver 49 for transmitting and receiving the synchronization signal corresponding to each of the plurality of synchronization signal distribution adjustment circuits 42. Further, the slave units A and B are provided with a driver 58 and a receiver 59 for transmitting and receiving the synchronization signal, respectively.

The synchronization signal output from the synchronization signal source 41 is input to the period measurement circuit 43 and also to the delay circuit 45. The period measurement circuit 43 measures the period Ts of the synchronization signal. The synchronization signal input to the delay circuit 45 is output from the delay circuit 45 with a delay of a predetermined time length. The delay time length is zero at the initial input of the synchronization signal. The synchronization signal output from the delay circuit 45 is output from the master unit 40 via the driver 48, passes through the receiver 59 on the slave unit A side, and is distributed to the device such as a load amplifier and an AD converter which need to operate synchronously in the sampling of the test force. The synchronization signal immediately before the arrival at the device is returned as it is, output from the slave unit A via the driver 58, passed through the receiver 49 on the master unit 40 side, and input to the time difference measurement circuit 44.

The time difference measurement circuit 44 obtains the time difference Td between the synchronization signal output from the delay circuit 45 and the synchronization signal returned from the slave unit A, and outputs the time difference Td to a multiplier 46 which multiplies 0.5 to reduce the time difference Td to a half value. The time difference Td multiplied by 0.5 by the multiplier 46 is input to an adder 47 as a negative value, and is added to the period Ts of the synchronization signal input from the period measurement circuit 43. The calculation result of the adder 47 is input to the delay circuit 45, and is held in the delay circuit 45 as a time length (delay time length) for delaying the output of the synchronization signal input from the synchronization signal source 41. As illustrated in FIG. 4, the delay time length is the time length obtained by Ts−0.5×Td, and the delay circuit 45 delays the synchronization signal by this amount of time length and outputs it. The delay time length held in the delay circuit 45 is sequentially updated while the synchronization signal is output from the synchronization signal source 41 and the synchronization signal distribution adjustment circuit 42 is operating.

The same operation is repeated in the synchronization signal distribution adjustment circuit 42 corresponding to the slave unit B. In the invention, by providing the synchronization signal distribution adjustment circuit 42 for each of the slave units A, B, and C, the synchronization signals are simultaneously distributed to the terminal devices of the slave units A, B, and C which are different in the time difference Td due to the difference in the distances to the master unit 40 and in the wiring configurations up to the master unit 40.

Figure 5:
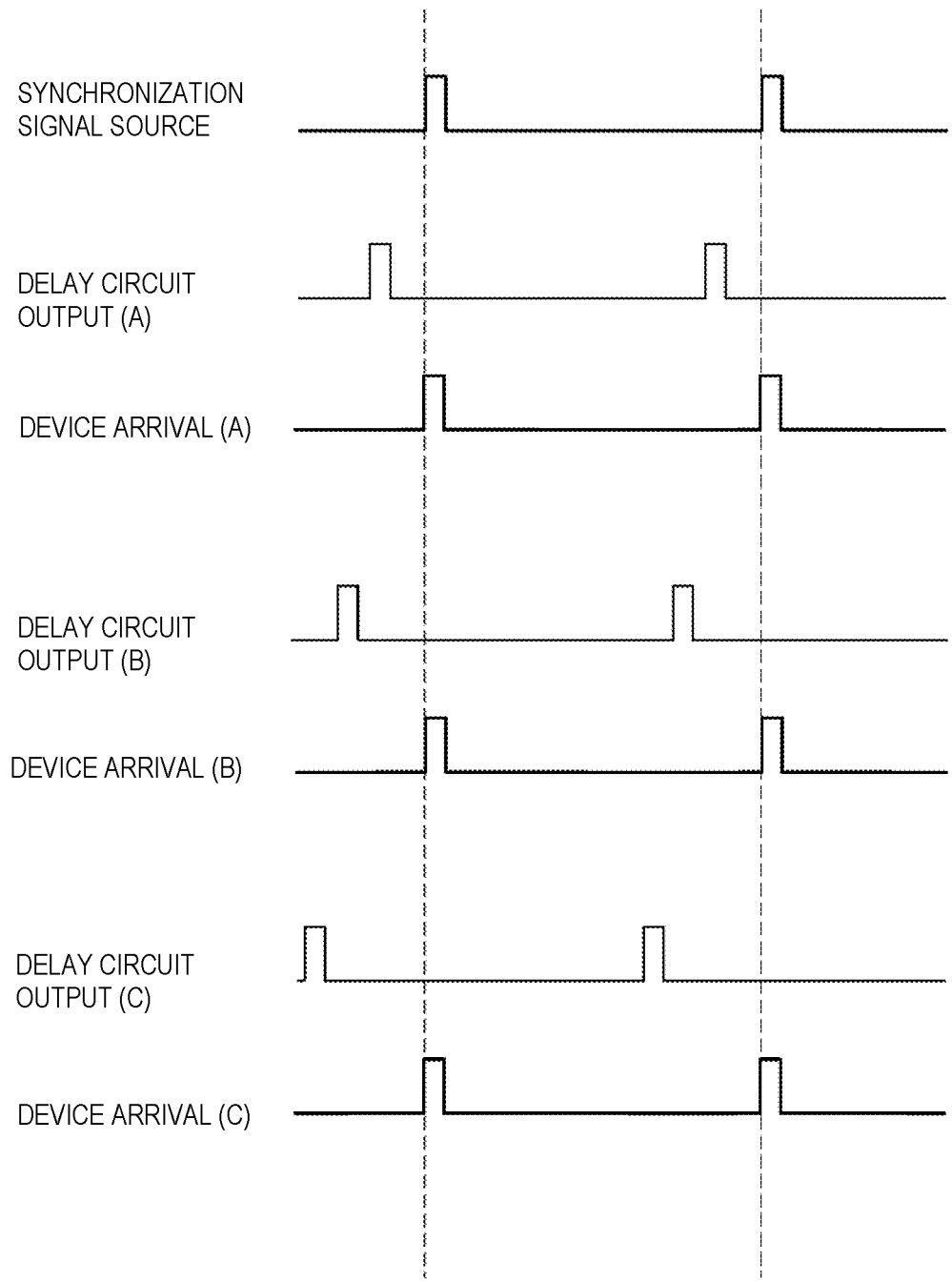
FIG. 5 is a timing chart for explaining device synchronization.

FIG. 5 is a timing chart illustrating device synchronization.

Due to the action of the synchronization signal distribution adjustment circuit 42 described above, the synchronization signal is output earlier by the delay time length to the slave unit far from the master unit 40 and the slave unit in which the buffer is inserted in the middle of the wiring. (A), (B), and (C) in FIG. 5 correspond to the slave units A, B, and C. The delay time length differs depending on the length and configuration of the wiring between the master unit 40 and each of the slave units A, B, and C. Therefore, the timings at which the synchronization signal is output from the delay circuit 45 occur at different time points, but the timings of device arrival shown by the thick line in FIG. 5 are synchronized at the time point shown by the broken line. In the above description, the delay circuit 45 delays the synchronization signal by the delay time length obtained by Ts−0.5× Td and outputs it, but in a series of synchronization signals that are repeatedly output at a fixed cycle, the output at a time point closest to the time point at which the synchronization signal reaches a plurality of devices using the synchronization signal is the signal earlier sent to each of the slave units A, B, and C by a half of the time difference Td.

In the invention, by providing the synchronization signal distribution adjustment circuit 42 for each of the slave units A, B, and C, the synchronization signals can be simultaneously distributed to the terminal devices of the slave units A, B, and C which are different in the distances to the master unit 40 and in the wiring configurations up to the master unit 40.

In the tensile test, a test force-displacement curve is created from the test force detected by the load cell 23 and the displacement detected by the displacement meter 24, and the material properties are evaluated. At this time, in the material testing machine to which the invention is applied, the operations of the sensors that detect different physical quantities are more accurately synchronized by adjusting the output timing of the synchronization signal from the master unit 40 to the measurement unit as described above. Thereby, the reliability of the measurement data can be improved.

The invention claimed is:

1. A material testing machine comprising:
a control device which includes a master unit, which includes a synchronization signal source configured to generate a synchronization signal, and a plurality of slave units, and operates the plurality of slave units in synchronization based on the synchronization signal from the master unit,
wherein the master unit includes the plurality of synchronization signal distribution adjustment circuits, each of which includes:
a period measurement circuit which measures a period of the synchronization signal output from the synchronization signal source,
a time difference measurement circuit which measures a difference between an issuing time point at which the synchronization signal is issued from the master unit to one of the plurality of slave units and a return time point at which the synchronization signal returns from the slave unit to the master unit, and a delay circuit which sets, as a delay time length, a time length which is obtained by subtracting a half of a time difference measured in the time difference measurement circuit from a period of the synchronization signal measured in the period measurement circuit, and delays a time point at which the synchronization signal is issued from the master unit to the slave unit by the delay time length.

2. The material testing machine according to claim 1, wherein the master unit includes:
- a driver which transmits the synchronization signal to each of the plurality of slave units via each of the plurality of synchronization signal distribution adjustment circuits, and
- a receiver that receives the synchronization signal from the slave unit,
- wherein the issuing time point is a time point at which the synchronization signal is output from the synchronization signal distribution adjustment circuit to the driver, and
- wherein the return time point is a time point at which the synchronization signal is input from the receiver to the synchronization signal distribution adjustment circuit.

3. The material testing machine according to claim 2, wherein
the slave unit is a measurement unit which processes a detection signal of a sensor which samples analog data.

\* \* \* \* \*